US008870979B2

(12) United States Patent
Bouillon

(10) Patent No.: US 8,870,979 B2
(45) Date of Patent: *Oct. 28, 2014

(54) METHOD FOR FORMING A VERTICAL THIN-FILM LITHIUM-ION BATTERY

(75) Inventor: Pierre Bouillon, Luynes (FR)

(73) Assignee: STMicroelectronics (Tours) SAS, Tours (FR)

(*) Notice: Subject to any disclaimer, the term of this patent is extended or adjusted under 35 U.S.C. 154(b) by 720 days.

This patent is subject to a terminal disclaimer.

(21) Appl. No.: 12/877,356

(22) Filed: Sep. 8, 2010

(65) Prior Publication Data
US 2011/0076568 A1 Mar. 31, 2011

(30) Foreign Application Priority Data

Sep. 28, 2009 (FR) ..................................... 09 56677

(51) Int. Cl.
| | |
|---|---|
| *H01M 4/04* | (2006.01) |
| *H01M 10/04* | (2006.01) |
| *H01M 2/02* | (2006.01) |
| *H01M 4/58* | (2010.01) |
| *H01M 10/0525* | (2010.01) |
| *H01M 10/0562* | (2010.01) |
| *H01M 10/0585* | (2010.01) |
| *H01M 4/38* | (2006.01) |
| *H01M 4/485* | (2010.01) |
| *H01M 4/525* | (2010.01) |
| *H01M 4/587* | (2010.01) |
| *H01M 4/66* | (2006.01) |
| *H01M 6/40* | (2006.01) |

(52) U.S. Cl.
CPC ........ *H01M 10/0436* (2013.01); *H01M 2/0207* (2013.01); *H01M 2/0277* (2013.01); *H01M 4/5815* (2013.01); *H01M 10/0525* (2013.01); *H01M 10/0562* (2013.01); *H01M 10/0585* (2013.01); *H01M 4/38* (2013.01); *H01M 4/485* (2013.01); *H01M 4/525* (2013.01); *H01M 4/587* (2013.01); *H01M 4/661* (2013.01); *H01M 6/40* (2013.01); *H01M 2300/0068* (2013.01); *Y02E 60/122* (2013.01)
USPC ........ 29/623.5; 29/623.1; 29/623.3; 429/137; 429/162; 429/209

(58) Field of Classification Search
None
See application file for complete search history.

(56) References Cited

U.S. PATENT DOCUMENTS 6,417,093 B1 * 7/2002 Xie et al. ...................... 438/626
6,495,283 B1 * 12/2002 Yoon et al. .................... 429/162

(Continued)

FOREIGN PATENT DOCUMENTS

DE     102008011523 A1    8/2009

OTHER PUBLICATIONS

L. Castoldi et al. "Copper-titanium thin film interaction", Microelectronic Engineering 76 (2004) 153-159.*

(Continued)

*Primary Examiner* — Milton I Cano
*Assistant Examiner* — Wojciech Haske
(74) *Attorney, Agent, or Firm* — Allen, Dyer, Doppelt, Milbrath & Gilchrist, P.A.

(57) ABSTRACT

A method for forming a lithium-ion type battery, including the successive steps of: forming, in a substrate, a trench; successively and conformally depositing a stack including a cathode collector layer, a cathode layer, an electrolyte layer, and an anode layer, this stack having a thickness smaller than the depth of the trench; forming, over the structure, an anode collector layer filling the space remaining in the trench; and planarizing the structure to expose the upper surface of the cathode collector layer.

20 Claims, 3 Drawing Sheets

(56) References Cited

U.S. PATENT DOCUMENTS

| | | | |
|---|---|---|---|
| 7,144,655 B2* | 12/2006 | Jenson et al. | 429/162 |
| 7,939,195 B2* | 5/2011 | Salot et al. | 429/162 |
| 2002/0071989 A1* | 6/2002 | Verma et al. | 429/176 |
| 2003/0118897 A1* | 6/2003 | Mino et al. | 429/149 |
| 2007/0172735 A1 | 7/2007 | Hall et al. | |
| 2007/0226990 A1* | 10/2007 | Morimoto | 29/623.1 |
| 2008/0032236 A1* | 2/2008 | Wallace et al. | 430/319 |
| 2009/0214899 A1* | 8/2009 | Shakespeare et al. | 429/7 |
| 2010/0012498 A1 | 1/2010 | Niessen et al. | |

OTHER PUBLICATIONS

French Search Report dated Apr. 23, 2010 from corresponding French Application No. 09/56677.

\* cited by examiner

METHOD FOR FORMING A VERTICAL THIN-FILM LITHIUM-ION BATTERY

CROSS REFERENCE TO RELATED APPLICATIONS

This application claims the priority benefit of French patent application number 09/56677, filed on Sep. 28, 2009, entitled METHOD FOR FORMING A THIN-FILM LITHIUM-ION BATTERY," which is hereby incorporated by reference to the maximum extent allowable by law.

BACKGROUND OF THE INVENTION

1. Field of the Invention

The present invention relates to a method for forming a thin-film lithium-ion battery.

2. Discussion of the Related Art

Lithium-ion type batteries have the advantage of comprising a solid non-flammable electrolyte, which further has a good ion conductivity over a wide range of temperatures. Such batteries could advantageously be used in mobile electronic devices such as cell phones or laptop computers.

To form thin-film lithium-ion batteries, typically batteries having dimensions smaller than 2.5×2.5 cm, techniques of sputtering through a shadow mask are commonly used. Such techniques comprise placing a shadow mask above a support or substrate and sputtering, through this mask, the different layers forming the battery.

However, for a large-scale production of thin-film lithium-ion type batteries, the use of shadow masks is relatively expensive. Indeed, for each sputtering involving a mask, the sputtered component also deposits on the mask. Thus, between each use of the mask, the different layers deposited on the mask need to be removed and recycled.

Techniques of battery forming by sputtering through a shadow mask also have the disadvantage of not being adapted to form batteries of smaller dimensions (below a 3-mm side length), due to the occurrence of mask alignment problems for such dimensions. Now, such batteries could advantageously be used as backup batteries to save key data in memories in the occurrence of a failure of a main battery.

To form small lithium-ion type batteries, it could be envisaged to adapt lithography techniques, which are well known and controlled in the field of integrated circuits. However, such techniques are relatively expensive when applied over large substrate surface areas. Further, lithography methods require the use of resins which are removed by wet processings (generally, with solvent-based aqueous mixtures) which would cause chemical reactions with the highly reactive lithium-based battery layers. Such techniques are thus not appropriate for the forming of lithium-ion type batteries.

There thus is a need for a method enabling to form relatively inexpensive and small lithium-ion type batteries in thin film technology, adapted to the presence of the highly reactive materials forming such batteries.

SUMMARY OF THE INVENTION

An object of an embodiment of the present invention is to provide a method enabling to form a planar thin-film lithium-ion type battery, compatible with the reactivity of the materials present in such batteries.

Another object of an embodiment of the present invention is to provide a method enabling to form small planar thin-film lithium-ion type batteries at a reasonable cost.

Thus, an embodiment of the present invention provides a method for forming a lithium-ion type battery, comprising the successive steps of:

(a) forming, in a substrate, a trench;

(b) successively and conformally depositing a stack comprising a cathode collector layer, a cathode layer, an electrolyte layer, and an anode layer, this stack having a thickness smaller than the depth of the trench;

(c) forming, over the structure, an anode collector layer filling the space remaining in the trench; and (d) planarizing the structure to expose the upper surface of the cathode collector layer.

According to an embodiment of the present invention, the method further comprises, after step (d), the steps of:

forming a protection layer over the structure and defining, in said protection layer, a first through opening above the anode collector layer and a second through opening above the cathode collector layer; and forming first and second conductive regions, respectively, in the first opening and in the second opening and over a portion of the protection layer.

According to an embodiment of the present invention, the method further comprises a step of forming of a first contact on the first conductive region and of a second contact on the second conductive region.

According to an embodiment of the present invention, the method further comprises, before step (c), a step of forming of a seed layer.

According to an embodiment of the present invention, the anode collector layer is formed by electrolytic growth at low temperature on the seed layer, the seed layer being formed of a stack of titanium and copper.

According to an embodiment of the present invention, the substrate is made of silicon or silicon oxide, the cathode collector layer is made of titanium, tungsten, molybdenum, tantalum, platinum, or of an alloy or a stack of these materials, the cathode layer is made of titanium lithium oxysulfide (LiTiOS), of cobalt lithium oxide ($LiCoO_2$), or of any material capable of inserting lithium usable as a cathode in lithium-ion type batteries, the electrolyte layer is made of lithium phosphorus oxynitride (LiPON), the anode layer is made of silicon, germanium, carbon, or a stack or an alloy of these materials, and the anode collector layer is made of copper.

According to an embodiment of the present invention, the cathode collector layer, the cathode layer, the electrolyte layer, and the anode layer are formed by physical vapor deposition.

According to an embodiment of the present invention, the protection layer is formed of a stack of a first layer made of a ceramic, of $Al_2O_3$, of SiN, or of $ZrO_2$, and of a second $SiO_2$ layer.

According to an embodiment of the present invention, the trench has a depth ranging between 5 and 30 µm, the cathode collector layer has a thickness ranging between 100 and 500 nm, the cathode layer has a thickness ranging between 1 and 10 µm, the electrolyte layer has a thickness ranging between 1 and 3 µm, and the anode layer has a thickness ranging between 10 and 800 nm.

An embodiment of the present invention further provides a lithium-ion type battery, comprising a substrate comprising a trench; a cathode collector layer along the walls and the bottom of the trench and on the substrate; a stack of a cathode layer, of an electrolyte layer, of an anode layer, and of an anode collector layer formed along the walls and the bottom of the trench, on the cathode collector layer, the stack filling the trench; and a protection layer extending over the insulating layer and over the stack, first and second through openings being formed in said protection layer, respectively above the anode collector layer and above the cathode collector layer.

The foregoing objects, features, and advantages of the present invention will be discussed in detail in the following non-limiting description of specific embodiments in connection with the accompanying drawings.

DETAILED DESCRIPTION

Figure 1A:
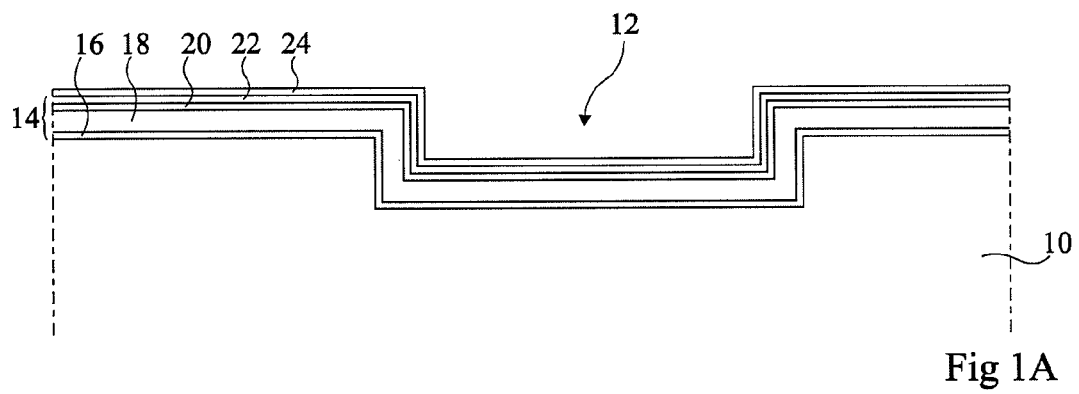
FIGS. 1A to 1E illustrate results of steps of a method for forming a thin-film planar lithium-ion type battery according to a first embodiment of the present invention.

For clarity, the same elements have been designated with the same reference numerals in the different drawings and, further, as usual in the representation of small thin-film components, the various drawings are not to scale.

FIGS. 1A to 1E illustrate results of steps of a method for forming a thin-film planar lithium-ion type battery (both electrode contacts being formed at the surface of the device).

At the step illustrated in FIG. 1A, it is started from a structure comprising a substrate 10 in which a trench 12 is formed. As an example, substrate 10 may be made of silicon, of silicon of high resistivity, or of silicon oxide. Trench 12 may for example be obtained by lithography, by means of a resin in which an adapted pattern is previously formed. Preferably, trench 12 has a depth ranging between 5 and 30 µm and surface dimensions of the substrate ranging between 700 and 900 µm.

A stack 14 of the different layers forming a lithium-ion type battery is formed on the upper surface of substrate 10 and on the bottom and the walls of trench 12. Stack 14 may be formed by a succession of physical vapor depositions (PVD). Stack 14 comprises the following layers.

A first layer 16 forming a cathode collector. This layer may be, as an example, made of titanium, tungsten, molybdenum, tantalum, platinum, or an alloy or a stack of these materials and have a thickness ranging between 100 and 500 nm.

A second layer 18 forming the battery cathode, made of a material such as LiTiOS (titanium lithium oxysulfide) or $LiCoO_2$ (cobalt lithium oxide), having a thickness ranging between 1 and 10 µm. More generally, layer 18 may be made of any material for inserting lithium usable as a cathode in lithium-ion type batteries.

A third layer 20 forming the battery electrolyte, for example made of LiPON (lithium phosphorus oxynitride) or of any other material capable of forming a solid lithium-ion cell electrolyte. Third layer 20 has a thickness ranging between 1 and 3 µm.

A fourth layer 22 forming the battery anode, for example made of silicon, germanium, carbon, or a stack or an alloy of these materials. The fourth layer has a thickness ranging between 10 and 800 nm.

Thus, stack 14 forming the active portion of the lithium-ion type battery may have a thickness ranging between 5 and 15 µm, this thickness being smaller than the depth of trench 12.

A fifth layer 24 forming a seed layer for the anode collector is formed on stack 14. As an example, this layer may be formed of a stack of titanium and copper. This layer also forms a protective barrier for the lower layers of the stack, and mainly for layers 18 and 20 formed of particularly reactive lithium compounds. As an example, seed layer 24 may have a thickness ranging between 100 and 300 nm. It should be noted that seed layer 24 may be omitted if the material forming the anode collector layer is capable of being directly formed on the battery anode.

It should be noted that, in FIG. 1A and in all the following drawings, a single elementary cell forming a lithium-ion type battery is shown. It should be understood that many batteries may be formed next to one another on substrate 10. As an example, the active regions of two adjacent batteries may be separated by a distance smaller than 1 mm, for example, ranging between 200 and 500 µm. It should be noted that the scribe line of each elementary battery may have a width smaller than 100 µm.

Figure 1B:
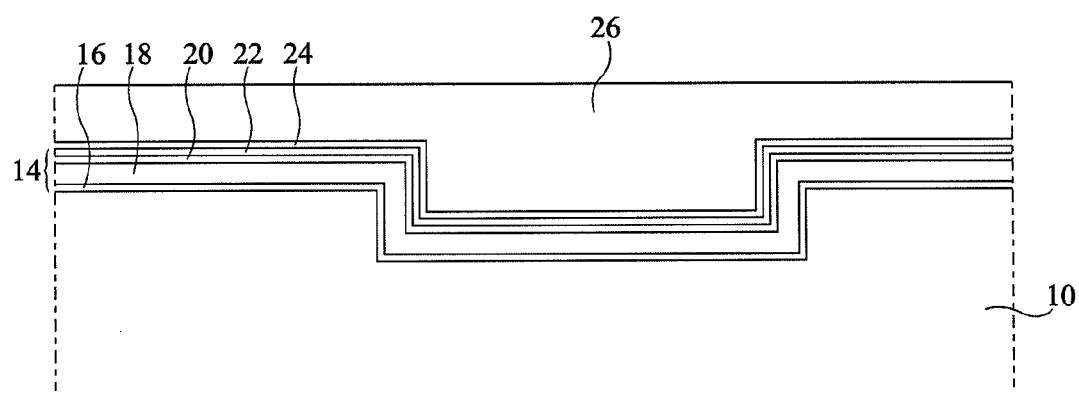
Figure 1C:
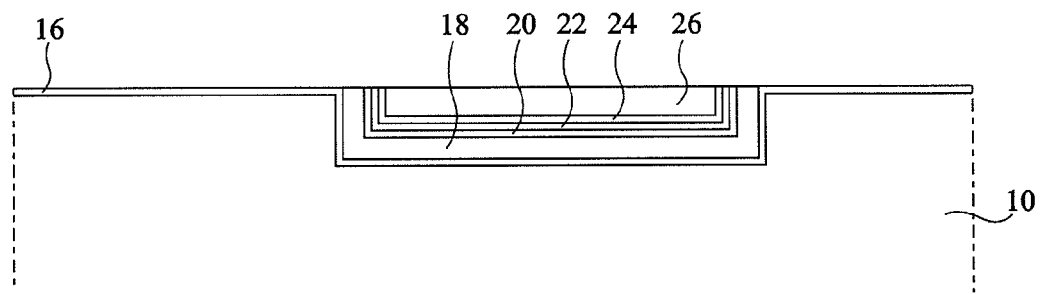

At the step illustrated in FIG. 1B, an anode collector layer 26, for example, made of copper, has been formed by electrolytic growth at low temperature (to avoid causing reactions of layers made of lithium compounds), on seed layer 24. The electrolytic growth is provided so that copper 26 completely fills the space remaining in trench 12 and also forms at the surface of the entire structure.

At the step illustrated in FIG. 1O, a planarization or polishing of the structure of FIG. 1B has been performed to remove all the layers located above the upper surface of the cathode collector layer 16 and thus expose this layer.

To perform this planarization, any known chem.-mech. polishing (CMP) or purely mechanical method may be used. Further, to remove the different layers of stack 14, except for layer 16, different types of planarization slurry may be successively used. To avoid any reaction of the materials of layers 20 and 22, non-aqueous slurry will be used. Conventionally, the planarization stop on cathode collector layer 16 may be determined by detection of a variation of a driving torque or of eddy currents, or by in situ visual inspection.

Figure 1D:
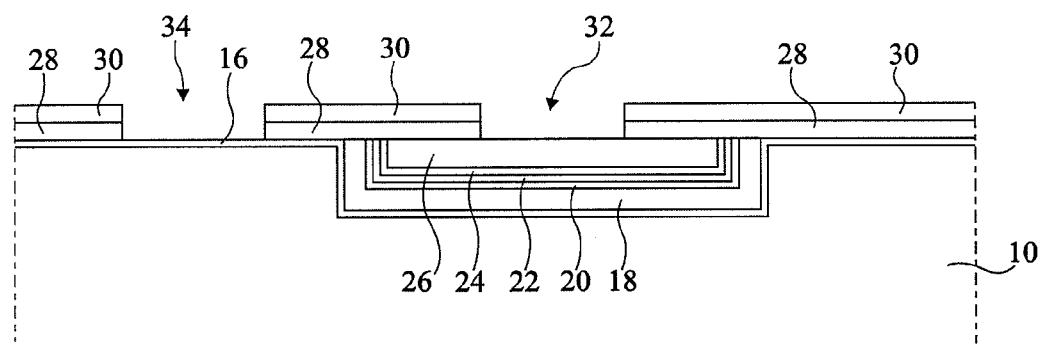

At the step illustrated in FIG. 1D, an insulating protection layer has been formed over the entire device. In the shown example, this protection is formed of a stack of two layers 28 and 30. It should be noted that the protection layer may be formed of a single layer of an adapted material. Stack 28/30 is in charge of protecting the portions of reactive material of stack 14 which are, at the step of FIG. 1O, in contact with air (layers 18 and 20). For this purpose, first layer 28 deposited over the entire structure may be a ceramic, $Al_2O_3$, SiN, or $ZrO_2$. Layer 30 is a passivation layer completing the first humidity barrier level provided by layer 28, without necessarily being a barrier against the diffusion of lithium. As an example, layer 30 may be made of $SiO_2$. Preferably, layer 28 has a thickness of a few tens of nanometers and layer 30 has a thickness on the order of 1 µm.

A first through opening 32 is formed in stack 28/30 above a portion of anode collector layer 26. Opening 32 enables to make a contact on anode collector layer 26. A second through opening 34 is formed in stack 28/30, above a portion of cathode collector 16, at the surface of substrate 10. Opening 34 enables to make a contact on cathode collector layer 16.

Preferably, openings 32 and 34 have a width ranging between 50 and 500 µm. As an example, openings 32 and 34 may be formed by lithography, the use of such a method being made possible by the presence of stack 28/30 for protecting the active battery layers.

Figure 1E:
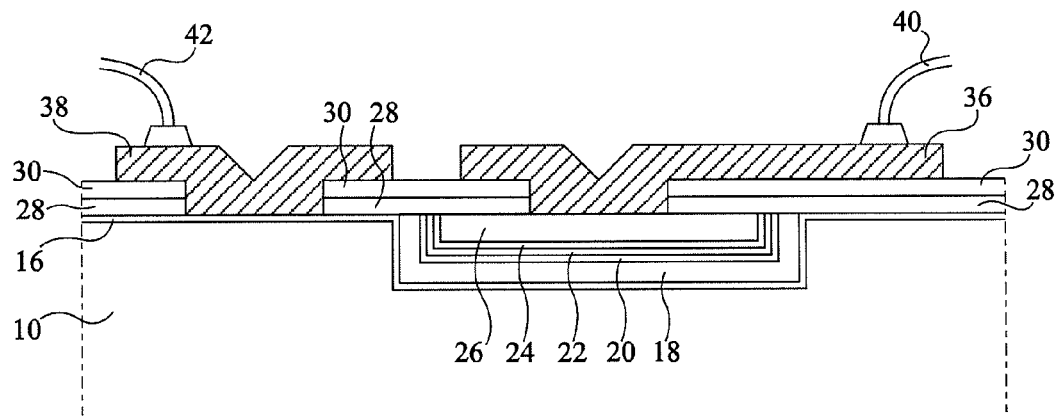

At the step illustrated in FIG. 1E, a first metallization 36 has been formed at the level of opening 32 and on a region of stack 28/30. Metallization 36 forms a contacting area on anode collector region 26. A second metallization 38 is formed at the level of opening 34 and on a region of stack 28/30 to form a contacting area on cathode collector region 16.

As an example, metallizations 36 and 38 may be formed by a full plate deposition of a metal or conductive layer, followed by an etching of this layer as appropriate. Metallizations 36 and 38 may be formed of a stack of aluminum and tantalum, of aluminum and titanium, or of aluminum and tantalum nitride.

An encapsulation of the entire device (not shown) is performed on this structure, for example, by deposition, over the entire structure, of a thick silicon oxide layer, of BCB, of resin, and more generally of a polymerizable resist. Two through openings are then formed in the encapsulation layer to enable to form first and second contacts. A first contact 40 is formed, through the encapsulation, on metallization 36 and a second contact 42 is formed, through the encapsulation, on metallization 38. In the shown example, contacts 40 and 42 are as an example formed by a wire bonding method.

A planar lithium-ion type elementary battery, formed in thin films, is thus obtained. A step of dicing of the elementary batteries is then carried out. Advantageously, the method disclosed herein provides a sequence of steps performed at low temperatures (below 300° C.), which is compatible with the presence of layers of reactive lithium compound materials and avoids the degradation of these materials.

Figure 2E:
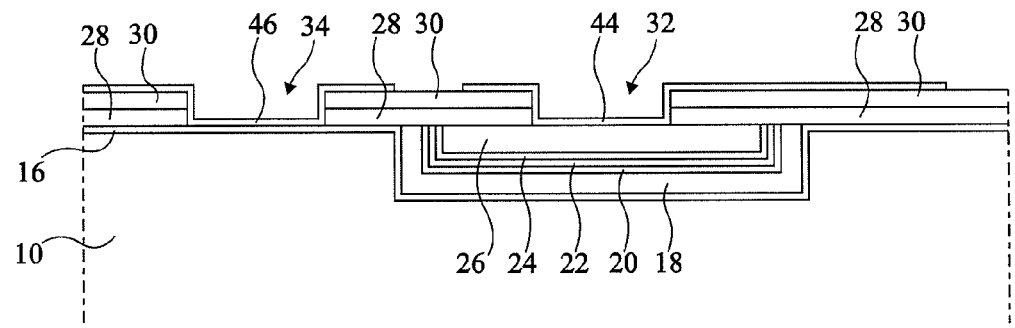
FIGS. 2E and 2F illustrate results of steps of a method for forming a thin-film planar lithium-ion type battery according to a second embodiment of the present invention.
Figure 2F:
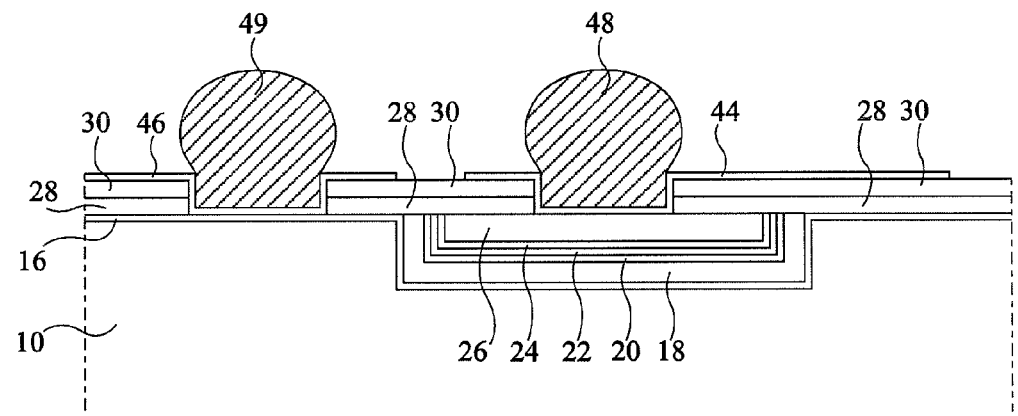

FIGS. 2E to 2F illustrate results of steps of a first variation of the method of FIGS. 1A to 1E, these steps being carried out from the structure of FIG. 1D (the steps of FIGS. 1A to 10 are common).

At the step illustrated in FIG. 2E, two portions 44 and 46 of an under bump metallization (UBM) layer have been formed on the structure of FIG. 1D. Portion 44 is formed at the level of opening 32 and on a region of stack 28/30 and portion 46 is formed at the level of opening 34 and on a region of stack 28/30. To form the two portions 44 and 46, a UBM structure may for example be formed over the entire device of FIG. 1D, after which this structure may be etched as appropriate, for example by lithography through a resin mask.

Conventionally, each portion 44 and 46 is formed of a stack of three layers, the first one providing the bonding on the lower conductive layer (16 or 22), the second one forming a barrier against the diffusion between the lower conductive layer and the third layer, and the third one providing the adhesion of the solder and improving the wettability thereof.

At the step illustrated in FIG. 2E, a solder bump 48, respectively 49, is formed on UBM portion 44, respectively 46. Solder bumps 48 and 49 may be formed on the structure of FIG. 2F by any known method. As an example, solder bumps 48 and 49 may have a diameter ranging between 200 and 250 µm.

An encapsulation of the structure of FIG. 2F may then be performed to protect and rigidify the assembly. The elementary batteries formed on substrate 10 are then diced.

FIGS. 3D to 3G illustrate results of steps of a second variation of the method of FIGS. 1A to 1E, these steps being carried out from the structure of FIG. 10 (the steps of FIGS. 1A and 1B are common).

Figure 3D:
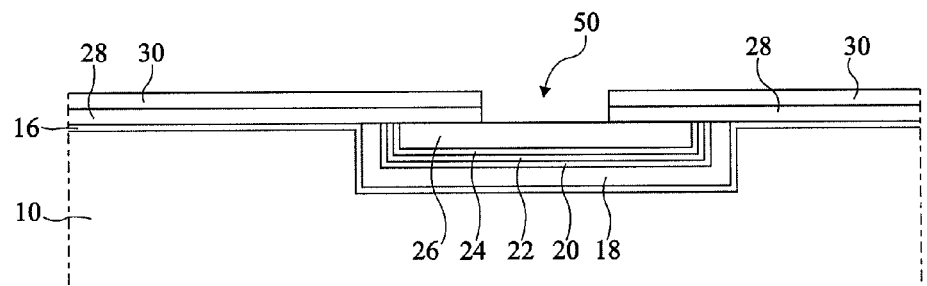
FIGS. 3D to 3G illustrate results of steps of a method for forming a thin-film planar lithium-ion type battery according to a third embodiment of the present invention.

At the step illustrated in FIG. 3D, an insulating protection structure has been formed over the entire device of FIG. 10. In the illustrated example, this protection is formed of a stack of two layers 28 and 30, for example made of materials identical to those described hereabove in relation with FIG. 1D.

A through opening 50 is formed in stack 28/30, above a portion of anode collector layer 26. Opening 50 enables to make a contact on anode collector layer 26. Preferably, opening 50 has a width ranging between 50 and 500 µm. As an example, opening 50 may be formed by lithography, the use of such a method being made possible by the presence of stack 28/30 for protecting the active layers of the battery.

Figure 3E:
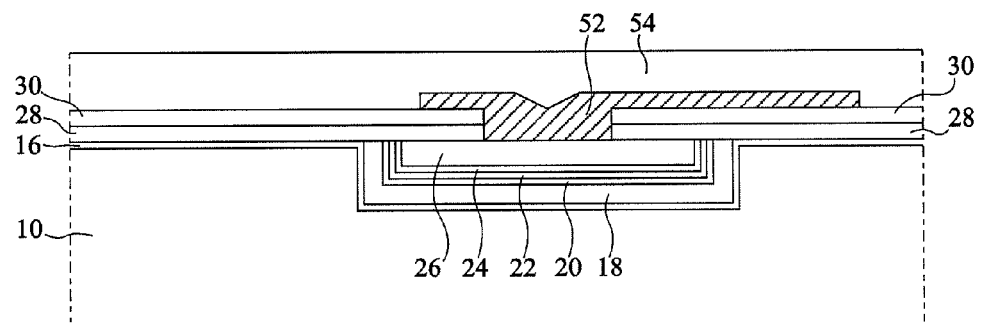

At the step illustrated in FIG. 3E, a metallization 52 has been formed at the level of opening 50 and on a region of stack 28/30. Metallization 52 forms the contacting area on anode collector region 26. As an example, metallization 52 may be made of a stack of aluminum and tantalum, of aluminum and titanium, or of aluminum and tantalum nitride. An insulating passivation layer 54 covering metallization 52, for example, made of silicon oxide or of an alloy of oxide and of silicon nitride, is then deposited over the entire device.

Figure 3F:
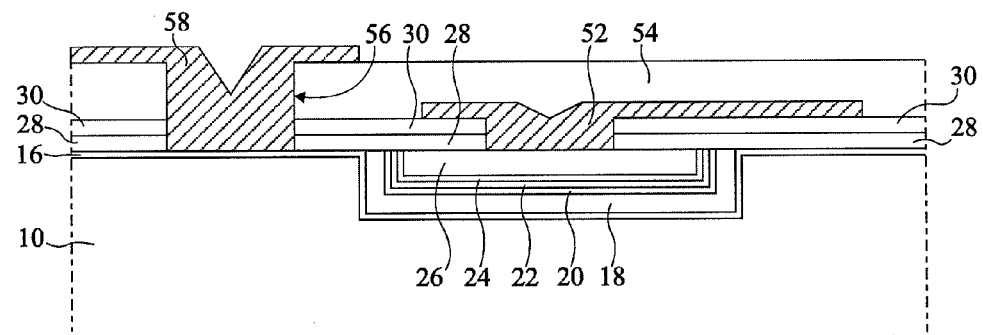

At the step illustrated in FIG. 3F, a through opening 56 has been formed in passivation layer 52 and in stack 28/30 above a portion of cathode collector layer 16, to expose this layer. As an example, opening 56 may be formed by lithography by means of a resin mask.

A metallization 58 is then formed at the level of opening 56 and over a region of cathode collector layer 16. Metallization 58 forms the contacting area on cathode collector region 16. An insulating passivation layer, for example, made of silicon oxide or of a stack of oxide and of silicon nitride (not shown), is then deposited over the entire device. As an example, metallization 58 may be made of a stack of aluminum and tantalum, of aluminum and titanium, or of aluminum and tantalum nitride.

Figure 3G:
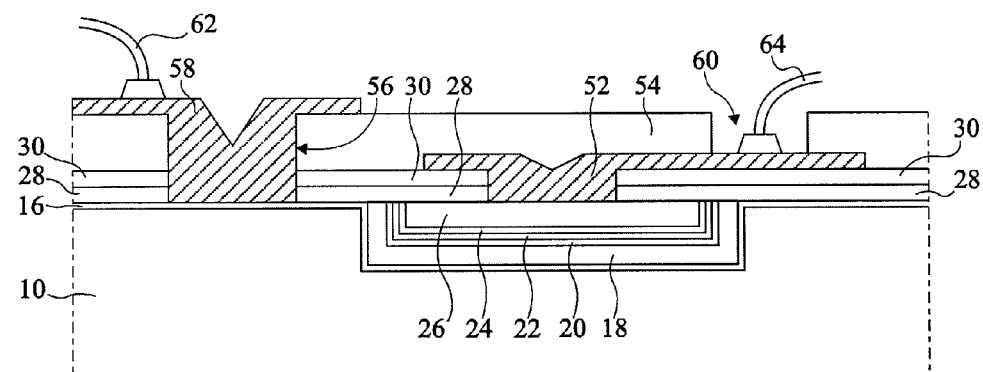

At the step illustrated in FIG. 3G, a through opening has been formed in the upper passivation layer, not shown, to form a contact 62 on cathode metallization 58. A second through opening 60, formed in the upper passivation layer and in passivation layer 54, enables to form a contact 64 on metallization 52.

In the illustrated example, contacts 62 and 64 are wire bonding contacts. It should be noted that contacts 62 and 64 may be made in the form of solder bumps, metallizations 52 and 58 being then replaced with UBM stacks.

The method described in the variation of FIGS. 3D to 3G has the advantage of avoiding the direct short-circuiting of the two battery electrodes. Thus, if the formed battery does not stand an initial short-circuit state, this variation will be preferred. In the opposite case (battery standing an initial short-circuiting of the electrodes), the methods of FIGS. 1A to 1E and 2D to 2F may be used (short-circuiting of the electrodes in the steps of FIGS. 1E and 2E, before the etching of conductive layer 36/38 or of UBM 44/46).

Specific embodiments of the present invention have been described. Various alterations and modifications will occur to those skilled in the art. In particular, it should be noted that the initial structure of FIG. 1A may also be obtained by depositing, on an insulating substrate, an insulating layer having a thickness ranging between 5 and 30 µm in which a through opening is formed.

Further, it should be noted that the materials used to form the active stack of the battery are given herein as an example only, and that any material capable of being conformally deposited may be used to form these layers.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for forming a lithium-ion type battery, comprising in succession:
   (a) forming, in a substrate, a trench, wherein the trench has a depth;
   (b) successively and conformally depositing a stack comprising a cathode collector layer, a cathode layer, an electrolyte layer, and an anode layer, this stack having a thickness smaller than the depth of the trench, wherein a space remains in the trench after said depositing; and
   (c) forming, over the stack, an anode collector layer filling the space remaining in the trench.

2. The method of claim 1, further comprising, before (c), forming of a seed layer.

3. The method of claim 2, wherein the anode collector layer is formed by electrolytic growth at low temperature on the seed layer, the seed layer being formed of a stack of titanium and copper.

4. The method of claim 1, wherein the substrate is made of silicon or silicon oxide, the cathode collector layer is made of titanium, tungsten, molybdenum, tantalum, platinum, or of an alloy or a stack of these materials, the cathode layer is made of titanium lithium oxysulfide, of cobalt lithium oxide, or of any material capable of inserting lithium usable as a cathode in lithium-ion type batteries, the electrolyte layer is made of lithium phosphorus oxynitride, the anode layer is made of silicon, germanium, carbon, or a stack or an alloy of these materials, and the anode collector layer is made of copper.

5. The method of claim 1, wherein the cathode collector layer, the cathode layer, the electrolyte layer, and the anode layer are formed by physical vapor deposition.

6. The method of claim 1, wherein the trench has a depth ranging between 5 and 30 µm, the cathode collector layer has a thickness ranging between 100 and 500 nm, the cathode layer has a thickness ranging between 1 and 10 µm, the electrolyte layer has a thickness ranging between 1 and 3 µm, and the anode layer has a thickness ranging between 10 and 800 nm.

7. The method of claim 1, further comprising accessing an upper surface of the cathode collector layer.

8. The method of claim 7, further comprising forming a protection layer over the structure and defining, in said protection layer, a first through opening above the anode collector layer and a second through opening above the cathode collector.

9. The method of claim 8, wherein the protection layer is formed of a stack of a first layer made of a ceramic, of $Al_2O_3$, of SiN, or of $ZrO_2$, and of a second $SiO_2$ layer.

10. The method of claim 8, further comprising forming first and second conductive regions, respectively, in the first opening and in the second opening and over a portion of the protection layer.

11. The method of claim 10, further comprising forming a first contact on the first conductive region and a second contact on the second conductive region.

12. The method of claim 7, wherein accessing the upper surface of the cathode collector layer comprises planarizing the structure to expose the upper surface of the cathode collector layer.

13. A lithium-ion type battery, comprising:
   a substrate having a surface, the substrate comprising a trench having walls and a bottom;
   a cathode collector layer along the walls and the bottom of the trench and extending out of the trench on the surface of the substrate;
   a stack of a cathode layer, an electrolyte layer, an anode layer, and an anode collector layer formed along the walls and the bottom of the trench, on the cathode collector layer, the stack filling the trench, wherein the cathode collector layer, the cathode layer, the electrolyte layer, and the anode layer have a combined thickness smaller than a depth of the trench; and
   a protection layer extending over the stack, first and second through openings being formed in said protection layer, respectively above the anode collector layer and above the cathode collector layer.

14. A lithium-ion type battery, comprising:
   a substrate having a surface, the substrate comprising a trench having a trench surface;
   a cathode collector layer along the trench surface and extending out of the trench along the surface of the substrate;
   a stack of a cathode layer, an electrolyte layer, an anode layer, and an anode collector layer formed along the trench surface, on the cathode collector layer, the stack filling the trench, wherein the cathode collector layer, the cathode layer, the electrolyte layer, and the anode layer have a combined thickness smaller than a depth of the trench.

15. The battery of claim 14, further comprising a protection layer extending over the stack, first and second through openings being formed in said protection layer, respectively above the anode collector layer and above the cathode collector layer.

16. A method comprising:
   forming a trench in a substrate, the trench having a volume;
   conformally depositing a plurality of layers such that at least a portion of the plurality of layers are within the trench, the plurality of layers comprising a cathode collector layer, a cathode layer, an electrolyte layer and an anode layer; and
   depositing an anode collector layer onto the plurality of layers, at least a portion of the anode collector layer being within the trench,
   wherein a volume of the portion of the plurality of layers and the portion of the anode collector layer is equal to the volume of the trench.

17. The method of claim 16, wherein the plurality of layers further comprise a seed layer, and wherein the anode collector layer is formed on the seed layer.

18. The method of claim 17, wherein the anode collector layer is formed by electrolytic growth at low temperature on the seed layer, and wherein the seed layer is formed of a stack of titanium and copper.

19. The method of claim 16, further comprising:
   planarizing the plurality of layers and the anode collector layer such that at least an upper surface of the cathode collector layer is exposed.

20. The method of claim 19, further comprising:
   forming a protection layer over the structure;
   forming a first through opening to the anode collector layer; and
   forming a second through opening to the cathode collector layer.

* * * * *